United States Patent Office 3,249,210
Patented May 3, 1966

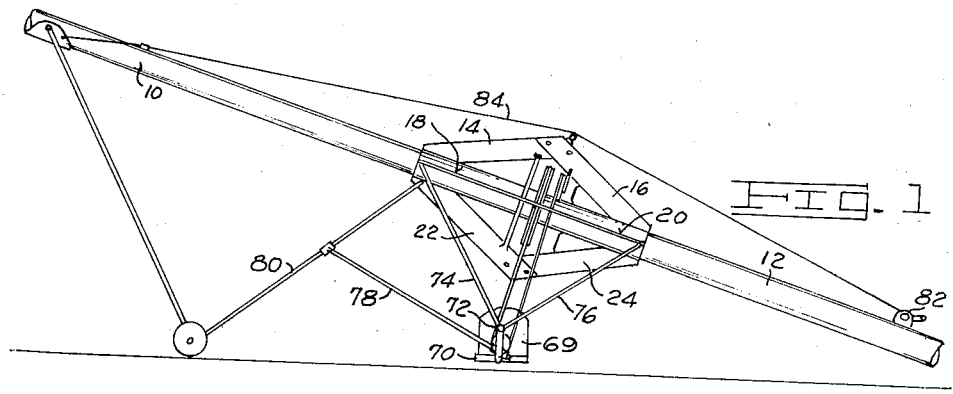

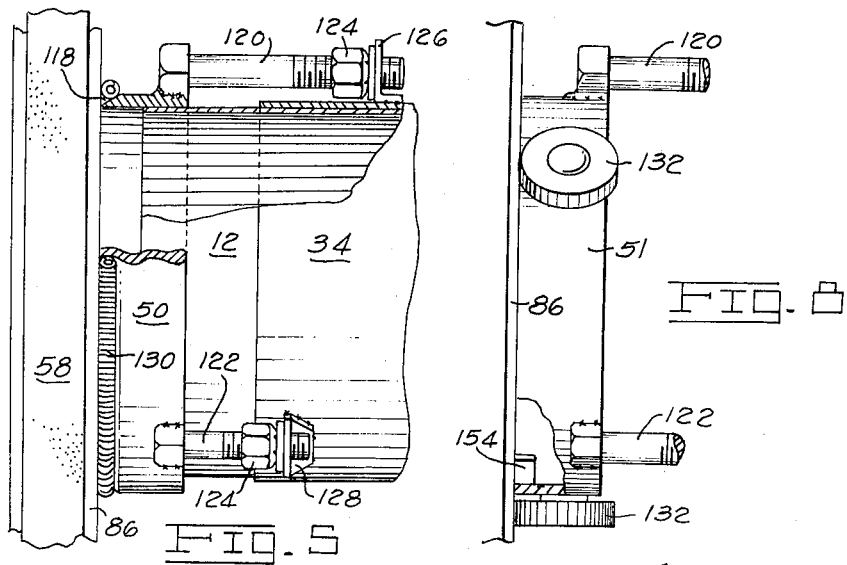
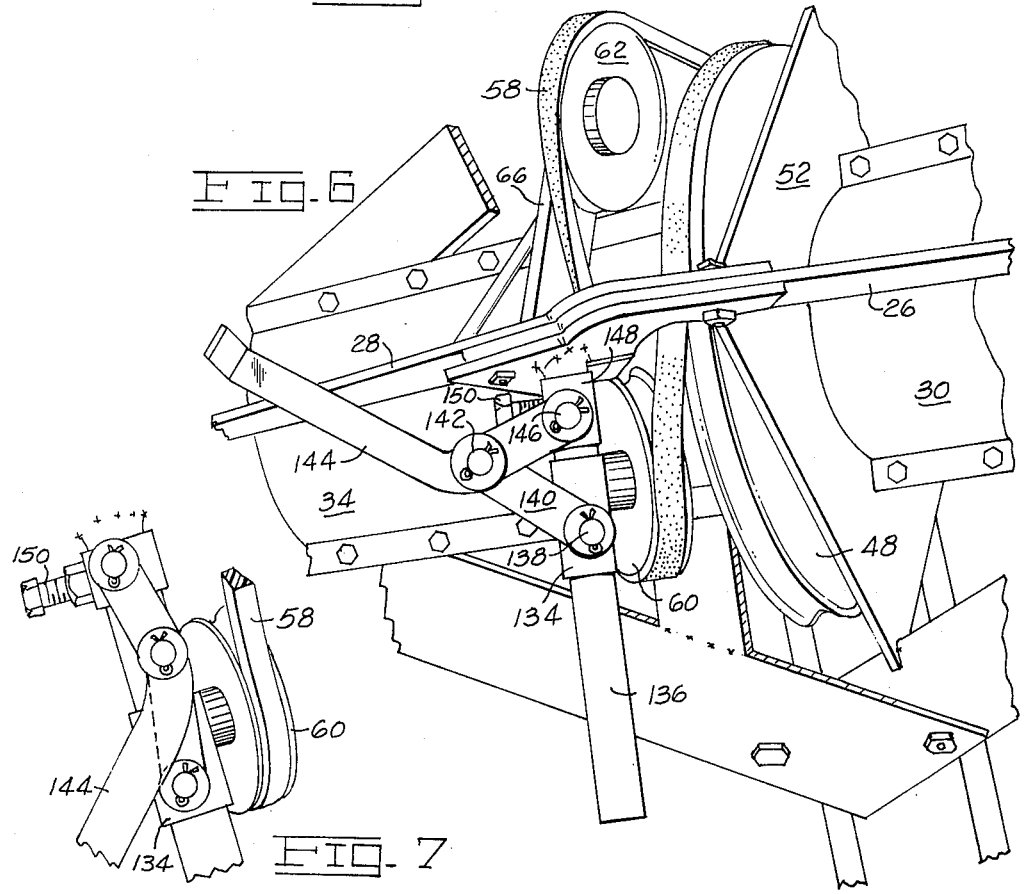

3,249,210
CENTER DRIVEN AUGER CONVEYOR
Martin Mayrath, Dallas, Tex., and Charles E. Pike and John W. Kendall, Dodge City, Kans., assignors to Mayrath Machinery Co., Inc., a corporation of Kansas
Filed Dec. 12, 1963, Ser. No. 330,176
10 Claims. (Cl. 198—213)

This invention relates to conveyors for grain and similar frangible or fluid materials, and in particular it deals with improvements in auger-and-tube or screw conveyors of the kind in which the auger screw is driven at an intermediate point in its length.

More especially the invention provides improvements in center-drive auger conveyors of the general type described and claimed in the copending application of Martin Mayrath et al., U.S. Serial No. 228,678, filed October 5, 1962, now U.S. Patent No. 3,198,320, and whose disclosure is by this reference incorporated in the instant application.

Certain of the improvements over that previous invention are directed to the provision of a construction which can be more easily assembled and adjusted with a view to obtaining an effective seal against the leakage of grain or the like at the joint between conveyor sections which lie on opposite sides of the drive connection. The construction herein disclosed not only provides a more effective initial sealing adjustment, but also one in which the integrity of the seal is maintained over long periods of use, and in which wear of the parts is minimized.

The new construction also provides an effective means by which the drive mechanism is rendered self-clearing as against the tendency of foreign material such as binder twine, green oat straw, baling wire or like stringy or fibrous material to wrap around the drive parts and thus to impede the flow of material being conveyed. This is accomplished by a simple and effective cutting or chopping means incorporated in the drive mechanism itself.

A further improvement in the previous construction is directed to a pulley and belt drive arrangement providing an increased angle of wrap of the belt about the main driven pulley, for a more powerful drive even with reduced belt tension. The new arrangement in this respect also permits a more convenient and more efficient clutch arrangement for connecting and disconnecting the drive for selective application of power from the prime mover to the auger.

The above and other objects are in general accomplished by providing adjustable collar means at the location of the drive pulley itself for accomplishing the relatively delicate adjustment of the auger tube ends or terminations with respect to the pulley surfaces, as contrasted with previous arrangements in which the adjustment depended upon endwise positioning of the entire auger and shaft plus the use of axially yielding sealing means for a variable gap or spacing of the tube ends from the rotating drive pulley or gear. The cutting action is obtained by providing a cutter element affixed to the inner periphery of at least one of the auger tube terminations where it can cooperate with the properly shaped edge of a spoke or drive web section of the rotating pulley.

A preferred embodiment of a conveyor incorporating all of the foregoing features will be described in detail below, in connection with the appended drawings, in which:

FIG. 1 is a partial side elevation of a complete conveyor incorporating the new features, FIG. 2 is a plan view, to a larger scale, of the region adjacent the improved drive means, FIG. 3 is a sectional view taken on line 3—3 of FIG. 2, FIG. 4 is a sectional view of the drive pulley itself and certain adjacent parts, taken on line 4—4 of FIG. 3, FIG. 5 is an enlarged sectional view similar to FIG. 4 but omitting certain parts in aid of a clear disclosure of the sealing ring construction, FIG. 6 is a fragmentary perspective view of the drive section looking at the opposite side from that visible in FIG. 1, and showing the idler pulley, belting and power clutch arrangement in one position of the clutch, and FIG. 7 is a similar view of part of FIG. 6 with the clutch in its other position of adjustment, FIG. 8 is a view similar to FIG. 5 showing a modified sealing ring construction.

Referring first to FIGS. 1 and 2 of the drawing, the invention is shown as applied to a wheeled portable grain auger or conveyor of the same general type as described in the above-mentioned application. The tubular auger casing is shown as comprising separate, coaxial sections 10 and 12, held in aligned relation by a ribbed, outrigged framework consisting of four sets in flat bars 14–16, 18–20, 22–24 and 26–28, each bar extending outwardly at an angle from a sleeve 30 or 34 to which it is welded at one end, and the outer ends of the bars of respective pairs being overlapped and bolted to one another as at 36. As indicated at 38 in FIG. 2, the overlapped outer ends of each pair of bars may be correspondingly crimped or offset to define a more definite relative position of these parts. The inner ends of these bars are welded to the respective sleeves 30, 34 into which the confronting end portions of tube sections 10 and 12 are inserted, for ready assembly and disassembly, as well as for increased strength.

Each sleeve section 30 and 34 is itself formed of two semi-cylindrical sheet metal half sections having terminal flanges as at 44 (FIG. 2) pulled up tightly about the corresponding end sections of the auger tubes 10, 12 by flange bolts 46; and the inner extremities of bars 14, 16, 22 and 24 are preferably welded to one flange of each sleeve half-section. The flanges may be reenforced with separate bolt-strips if desired.

A main drive pulley 48 encircles the mutually confronting tube section extremities, its central web passing through a gap between said extremities in a manner to be described below, with the gap sealed as by an encircling metal ring or collar 50 (FIGS. 2 and 4). Bars 14, 18, 22 and 26 may be connected by welding to a square bracing or stiffening plate 52 encircling sleeve section 30 and welded to an annular heavier-gauge bearing ring to be detailed below. Bars 16, 20, 24 and 28 may similarly be braced by welded gusset plates such as 54, 56 extending from their outer ends to the half-sections of sleeve 34.

As best shown in the top view of FIG. 2, the drive belt 58 passes about nearly a 180 degree section of the peripheral groove of pulley 48, thence about an angled or skewed idler pulley 60 (movable for the clutching function as detailed below) and thence upward about a fixed idler pulley 62, across the top of the tube assembly but beneath bars 14 and 16, over a second fixed idler pulley 64, and downward to the engine drive pulley from whence it returns to the main auger pulley 48. Since all three of the idler pulleys are rotatably mounted on cantilevered stub shafts, the belt can be replaced without any removal of pulleys. The fixed idler pulleys are carried by plates 66, 68 welded to the respective bars 28 and 20, which plates may be provided with diagonal braces, as shown, if desired.

A driving engine 69 is shown as mounted on a cradle 70 in FIG. 1, pivoted at the joint axis 72 between two converging tubular elements 74, 76 having their flattened upper ends bolted to the extremities of bars 18 and 20, as described in the above-mentioned application. A duplicate set of tubular elements depend from the horizontally-opposite bars (26, 28 of FIG. 2) and support the other end of the pivot axis of the cradle. A control rod 78 connects the cradle to a point on a wishbone frame element 80 of the conveyor, for automatic leveling of the engine cradle as the inclination of the auger is altered. An inclination control winch 82 is shown, its cable 84 passing over a pulley carried at the joint of bars 14 and 16. The operation of these parts for automatic engine leveling is as described in the said application.

In FIGS. 3 and 4, pulley 48 is shown as having the usual V-grooved rim and a central web plate 86 formed as an equilateral triangle whose truncated corners are welded to the inside of the rim. The sides of this triangle plate are braced against the rim by welded gussets 90, and adjacent each of its corners the plate carries a roller 92 on an anti-friction bearing bolted to the plate at 94 (FIG. 4). These bearing rollers have radial bearing contact about tube section 10, or rather about a heavier-gauge bearing ring or collar 96 welded to plate 52 and forming a continuation of sleeve 30; see FIG. 4. Web plate 86 does not lie in the central plane of the pulley rim, but is offset as best shown in FIGS. 2 and 4, to pass into the gap between the confronting extremities of tube section 12 and ring 96.

However, the web plate does not extend inwardly beyond the tube or sleeve walls at this point; as shown best in FIG. 4, it is apertured as at 98 so as to be flush with the inner walls of the tube sections except where the single "spoke" or sector 100 of about a 45-degree angular width connects the pulley (rim and web plate) to a shaft section 102 of square or equivalent non-circular cross-sectional shape. This square section may be forged integral with, or welded to, the end of the auger shaft section 104 to which the helical auger flight 109 is welded in the usual way. The extremity of the square section 102 is secured into a hollow shaft 110, or a hollow connecting sleeve in turn bolted to the other auger shaft section to which the remainder of the helical flight 112 is welded as usual. The end of flight 109 extends past the end of the square section 102, and is bolted as at 114 to the other flight 112, this arrangement permitting the entire apparatus to be broken down into parts of reasonable size for shipment.

As clearly shown in FIG. 3, the square section shaft 102 loosely receives a collar 116 of similar (square) internal shape, which collar is welded or otherwise secured to the inner terminus of the "spoke" or sector 100 of the pulley web. This floating arrangement enables adjustment of the gap between the end face of ring or collar 96, and the proximate face of the pulley web plate 86, and the gap between the other face of the web plate, and the collar 50, in a very simple manner.

Thus, it is merely necessary to adjust the position, along sleeve 34, of the ring or collar 50. Referring now to FIG. 5, this ring 50 is shown as having a bevelled end face 118, and its inner diameter is sized to be a close sliding fit over that part of auger tube 12 which projects beyond the end of the sleeve 34. Welded to equally-spaced points about the periphery of ring 50 are the heads of threaded mounting bolts, of which only two are shown, these being numbered 120 and 122. On each bolt is threaded a nut such as 124 of the "self-locking" type; that is, having a frictional insert to prevent accidental rotation after it has been tightened in place. The threaded ends of all the bolts pass through washers and thence through holes in respective angle brackets such as 126, 128, welded to the outer surface of the sleeve 34. By rotating the three nuts in turn, the operator can readily adjust the tightness of the bearing of the end face of ring 50 against the proximate face of the pulley web plate, an adjustment which in the earlier form of the invention required a difficult positioning of the thrust bearing at one extremity of the conveyor.

A closely spiralled helical spring 130, such as an endless door-spring, is positioned to encircle the end of collar 50 adjacent the pulley face, and its tension, coacting with the bevel 118 of the collar, causes the spring to be urged against the pulley face, where it prevents the discharge of even small amounts of grain or the like through the minute gap that is allowed to remain between the rubbing faces of these parts. The bolt 120 is shown as somewhat longer than bolt 122 merely because if its bracket were positioned at the same distance as the one for bolt 122, the belt 58 passing close by would interfere with the adjusting wrench.

FIG. 8 shows, in a view similar to FIG. 5, a variational form of the sealing collar, designated 51, and provided with a set of three equally spaced anti-friction rollers 132 carried on stud shafts butt-welded to the peripheral face of the ring, and with a common tangent plane just clearing the end face of the ring. In this modification, the adjustment of the nuts on studs or bolts 120, 122, etc., will bring the rollers into contact with the face of the pulley's web plate 86 with a predetermined minimal clearance as well as between the opposite face of the web plate and the proximate end face of the opposite tubing collar 96.

FIGS. 6 and 7 show in perspective the operation of the movable idler pulley 60 by which the drive from the engine is engaged and disengaged. For clarity, the view of FIG. 6 is taken from slightly beneath the bars 26 and 28, and looking at the opposite side from that visible in FIG. 2. As shown, the pulley 60 is carried by a stub shaft welded to a square collar 134 that can slide along a square bar 136 welded at one end to the underside of the extremity of bar 26, and so angled that the plane of pulley 60 is approximately tangent to the pitch circles of both of pulleys 48 and 62 in all positions of collar 134 along bar 136. A pivot pin 138 affixed to collar 134 mounts one end of a link 140 whose opposite end is pivoted at 142 to a mid position on crank lever 144, whose free end forms a control handle. The other end of the crank is pivoted at 146 to a square collar 148 that can be set in a desired position along bar 136 by a set screw 150. The positioning of collar 136 allows the over-center action to be obtained for various slight changes in belt length due to stretch and the like causes.

In FIG. 6, the handle crank 144 is shown in declutched position, the idler pulley 60 being closest to the pulleys 48 and 62, so that the belt runs loose. To engage the drive, the crank handle is turned down into the FIG. 7 position, causing link 140 and the pivoted end of crank 144 to pass through, and slightly beyond, an aligned condition, at which time the handle strikes the pivot 138, and collar 134 is held in this position by the belt tension acting against the overcenter toggle arrangement of these parts.

An important feature of the invention lies in the provision of a cutter arrangement of very simple form, which will cut or chew up long or tenacious fiber material, string, wire or the like which otherwise might foul the drive action at the pulley 48. This cutter, as shown in FIGS. 3 and 4, comprises merely a sharpened (and/or hardened) block of steel 152 welded to the inside surface of collar or ring 96 that was described above as welded to the stiffening plate 52. This lug or block 152 is positioned at the edge of the collar closest to the web plate and spoke root of the pulley, so that when the parts are assembled as shown, the cutter will cooperate with the rotating square-cut spoke edge to perform the desired shearing action. As indicated in FIG. 8, such a cutter lug 154 may alternatively, or additionally, be secured to the inner surface of the opposite sealing ring 51 for coaction with the opposite square-cut face of the pulley spoke. Obviously, such a lug could be mounted inside the ring or collar 50 of FIGS. 3–5, if desired.

What is claimed is:

1. A center drive auger conveyor comprising an auger shaft, an auger flight surrounding and connected to said shaft, a pair of axially aligned auger housing tubes surrounding said flight with their proximate ends spaced from one another, a drive wheel having a web section apertured to conform to the openings of said housing tubes and mounted for rotation about their common axis, spoke means terminating in a non-circular socket portion loosely connecting said web section to a non-circular portion of said auger shaft for rotation therewith but in axially-floating relation thereto, a sealing collar closely surrounding one of said housing tubes adjacent said web section, and positive-acting means for adjusting the axial position of said collar relative to said one housing tube and to said web section.

2. A conveyor in accordance with claim 1, in which said sealing collar has an externally beveled edge adjacent the proximate face of said web section.

3. A conveyor in accordance with claim 2, and a closely spiraled endless coil spring embracing said beveled edge and urged by its own tension and said beveled edge against the proximate face of said web section.

4. A conveyor in accordance with claim 1, and a cutter element fixedly supported by one of said housing tubes adjacent the path of said spoke means and in the clearance space between said auger flight and said one of said housing tubes.

5. A conveyor in accordance with claim 1, and a cutter element secured to the inner surface of said collar adjacent the path of said spoke means.

6. A conveyor in accordance with claim 1, in which said collar carries spaced bearing rollers positioned to ride along the surface of said web plate.

7. A center-drive auger conveyor including axially aligned auger tubes having their proximate ends held closely adjacent one another by an outrigged framework of outwardly canted bar elements secured to said tubes and to one another, in pairs, at their distal ends, a drive pulley having its central web disposed between said ends and connected to auger flighting within and extending between said tubes, the periphery of said pulley lying outside said tubes and within said framework, at least three idler pulleys widely spaced about the axis of said tubes and secured to said framework to direct a belt over said drive pulley throughout a substantial proportion, approaching one-half of the full peripheral length of said drive pulley, and a belt passing around said idler pulleys and engaging the drive pulley, said belt following a closed path which does not encompass the axis of said drive pulley.

8. A conveyor in accordance with claim 7, in which one of said idler pulleys is mounted for limited movement in a direction generally tangential to the peripheral circle of said drive pulley, to control the drive of said drive pulley by variation in the belt tension.

9. A conveyor in accordance with claim 7, in which all of said idler pulleys are journalled at the ends of cantilevered stub shafts, to permit removal and replacement of the belt without disassembly of said pulleys.

10. A conveyor in accordance with claim 8, including an over-center toggle mechanism for controlling the position of said one idler pulley, to lock it in its position of maximum belt tension.

References Cited by the Examiner
UNITED STATES PATENTS

| | | | |
|---|---|---|---|
| 1,032,850 | 7/1912 | Mount | 198—213 |
| 2,610,727 | 9/1952 | Beldin | 198—213 |
| 3,140,620 | 7/1964 | Ferara | 74—221 |

EVON C. BLUNK, *Primary Examiner.*

RICHARD E. AEGERTER, *Examiner.*